United States Patent [19]
Butts

[11] Patent Number: 4,715,229
[45] Date of Patent: Dec. 29, 1987

[54] APPARATUS FOR VIBRATION TESTING

[75] Inventor: Gary Butts, Huntington Beach, Calif.

[73] Assignee: Ling Electronics, Inc., Anaheim, Calif.

[21] Appl. No.: 859,620

[22] Filed: May 5, 1986

[51] Int. Cl.<sup>4</sup> ............................................. G01M 7/00
[52] U.S. Cl. ....................................... 73/663; 73/668
[58] Field of Search ................. 73/663, 665, 666, 667, 73/668; 310/27

[56] References Cited

U.S. PATENT DOCUMENTS

| | | | |
|---|---|---|---|
| 3,044,292 | 7/1962 | Matthews | 73/667 |
| 3,062,041 | 11/1962 | Spodnewski | 73/668 |
| 3,262,308 | 7/1966 | Schloss | 73/668 |
| 3,369,393 | 2/1968 | Farmer | 73/663 |
| 3,536,942 | 10/1970 | Zamparo | 73/668 |
| 3,686,927 | 8/1972 | Scharton | 73/665 |
| 4,633,716 | 1/1987 | Martin | 73/663 |

*Primary Examiner*—John Chapman
*Attorney, Agent, or Firm*—Joseph V. Claeys; Joseph C. Sullivan

[57] ABSTRACT

An electro-mechanical shaker apparatus utilizing a novel design is disclosed. The shaker apparatus includes an armature frame which is directly coupled to an armature coil to form an integrated unit. The shortened height of the unit effectively raises telescoping resonant frequencies above the spectrum of test frequencies. The armature frame is comprised of a top plate, bottom plate, and an intermediate section to form a laminated/honey-combed design. The top and bottom plates have a higher modulus of elasticity, while the intermediate section has a lower mass density, which effectively raises bending resonant frequencies above the spectrum test frequencies.

10 Claims, 14 Drawing Figures

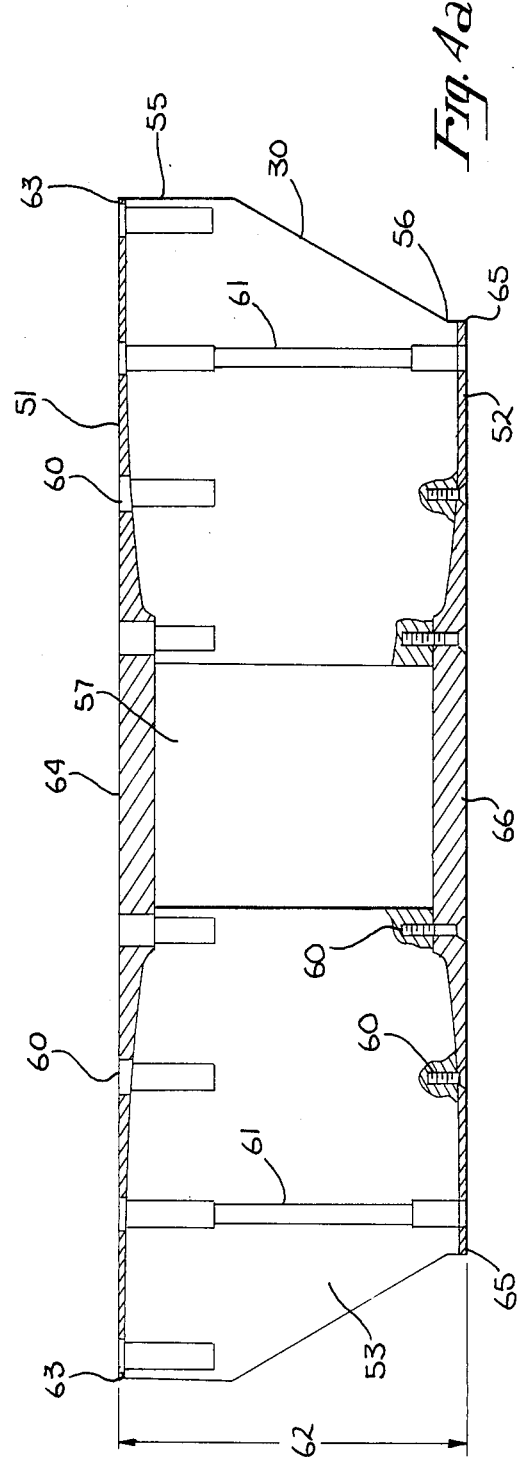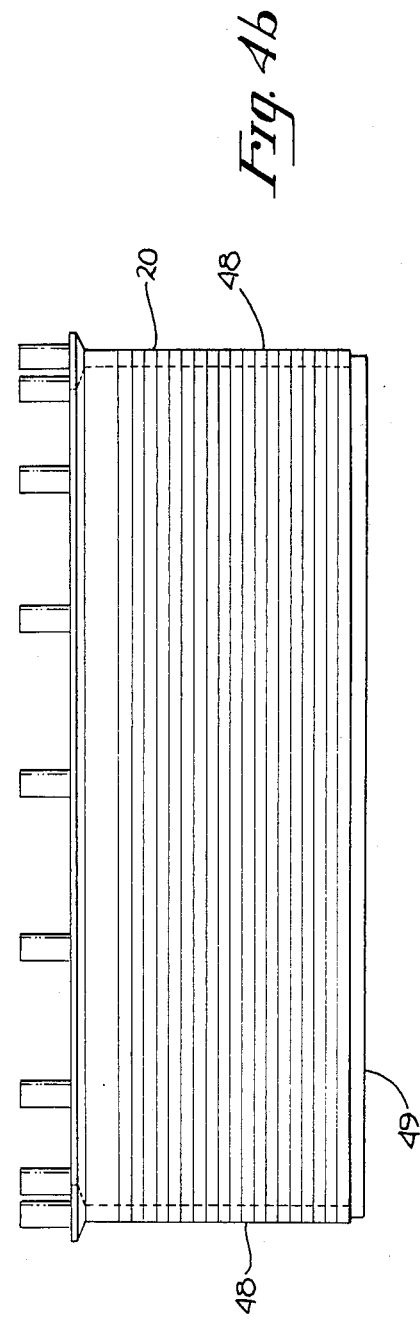

APPARATUS FOR VIBRATION TESTING

BACKGROUND OF THE INVENTION

The present application has been filed concurrently with U.S. Pat. applications, Ser. No. 859,609, filed May 5, 1986 and Ser. No. 859,611, filed May 5, 1986, and assigned to the assignee of the present application.

1. Field of the Invention

The present invention relates to the field of mechanical shakers and more specifically to electromagnetically driven armature shakers.

2. Prior Art

There are a considerable number of shakers that are well-known in the prior art. These shakers are used to mechanically shake an item for the purpose of diagnostically testing responses to certain driving forces. The item is physically attached to a moving portion of a shaker and when the shaker is activated, the item is subjected to a variety of test conditions. The moving portion of the shaker is typically driven by a force which may be continuous, cyclical or impulsed.

One class of these shakers employs the use of an electrodynamically driven armature to provide the shaker's mechanical movement. Typically, a housing unit contains a stationary field coil which is connected to an external power source. A freely moving armature located within the housing contains an armature coil which is driven by a power amplifier. The armature coil is fixed to the shakaing portion of the unit, such as an armature frame.

By providing a varying drive signal from the amplifier to the armature coil, the armature will respond and move accordingly due to a change in the electromagnetic field. The size and direction of the shaker force is determined by the strength of the driving signal from the power amplifier and the power applied to the stationary field coil.

A variety of platforms or tables are normally coupled to the armature, wherein the item to be subjected to testing is mounted onto the table by fixed means, such as bolts, screws, etc. The platform or table is usually constructed from a hard substance, such as metal, to prevent deformation of the platform which will interfere with the resultant testing.

One side-effect from using such an armature frame is the generation of unwanted frequency components from the mechanical movement of the shaker armature. These unwanted frequencies are generated as a result of oscillations created within the moving metal. Such oscillations finally reach a peak resonant frequency of the particular material in motion and tend to have disruptive effects by producing undesirable additional factors during the testing cycle. A number of types of resonance are encountered in prior art armature frames. One is the telescoping resonance associated with the height of the table and the other is the bending resonance associated with the mass/stiffness distribution of the table.

Another problem encountered in prior art shakers is the stress placed on central armature shaft bearings. Typically, an armature is placed in the shaker housing, such that the armature coil windings fit within the circumference of the field windings. A shaft attached to the armature frame couples the armature to the housing, but, because the armature requires movement, a surface having a low coefficient of friction is necessary.

To mechanically couple the armature shaft to the shaker housing, a bearing is normally used. Metal roller or ball bearings provide a lower coefficient of friction yet have the strength to support a substantial load. Further, because most armatures only have linear movement (up and down motion), prior art linear motion bearings have been used. One such linear motion ball bearing is disclosed in U.S. Pat. No. 3,900,233, wherein several linear ball bearing tracks have been designed in the interior wall of the bearing housing. However, such a track design limits the loading factor on the ball bearings, because each track must be spaced so as to allow for the placement of the non-loading return track.

A further problem is associated with means to stabilize the shaker armature during operation. Typically, an armature shaft is smaller in diameter in comparison to the diameter of the armature. To prevent table wobble, some retainer means are needed to support the armature. Prior art methods have used springs and rubber bushings, if any support were used at all.

What is needed then is an improved shaker assembly having an armature which provides a test result which is more independent of the resonant frequencies encountered in the equipment, a bearing which allows a better load transfer at a reduced coefficient of friction, and a supporting mechanism which produces high lateral load capability and lateral stiffness with little vibration interference, if any.

SUMMARY OF THE INVENTION

An electro-mechanical shaker apparatus utilizing a novel design is disclosed. A fixed field winding and a moveable armature provide the electrodynamic coupling for axially moving an armature table which is fixed to the armature coil. The armature assembly is held in position by a center shaft. The shaft is placed within a recirculating bearing which provides a low coefficient of friction when the armature is driven.

The armature frame is comprised of flat, circular, thin upper and lower plates and a middle-section between the two plates. The height of the armature frame in the armature raises any telescoping resonant frequencies encountered. The bending resonant frequencies are effectively shifted above the testing spectrum of frequencies also by the laminated design of the armature frame. The top and bottom plates are constructed of materials having a higher modulus of elasticity, while the middle section is constructed from materials having a lower density.

The recirculating bearing includes a housing which includes a plurality of return channels located concentric to the inner wall of the housing. A plurality of balls are positioned between the shaft and inner wall of the housing, as well as in the channels. Top and bottom retainers, having recessed areas which permit the balls to move from the interior position next to the shaft to one of the channels, are placed to enclose the balls within the housing. As the shaft moves axially, the balls recirculate through the channel. Because there are no movement restrictions to balls located in the interior position next to the shaft, the bearing may also be used for rotational movement of the shaft.

A linkage system attached to the upper portion of the armature and the shaker housing reduces wobble of the armature. The linkage system is comprised of a plurality of link arms. Each link arm includes two end members coupled to a common center member, wherein the three members provide three pivoting points in an axial direction of the shaft, but prevent any lateral movement. The pivoting action of the link arm further compensates for the change in the physical distance of the shake table from the shaker housing support as it moves axially.

BRIEF DESCRIPTION OF THE DRAWINGS

FIG. 4a is a cross-sectional view of an armature frame of the present invention which is shown in FIG. 1.

FIG. 4b is a plan view of an armature coil of the present invention which is shown in FIG. 1.

FIG. 5b is a split pictorial view of the link arm of FIG. 5a.

DETAILED DESCRIPTION OF THE PREFERRED EMBODIMENT

An armature type shaker having an improved armature frame, a recirculating ball bearing and link arm suspension system is described. In the following description, numerous specific details are set forth such as specific thicknesses, etc. in order to provide a thorough understanding of the present invention. However, it will be apparent to one skilled in the art that the present invention may be practiced without these specific details. In other instances, well-known structures have not been described in detail in order not to unnecessarily obscure the present invention.

Figure 1:
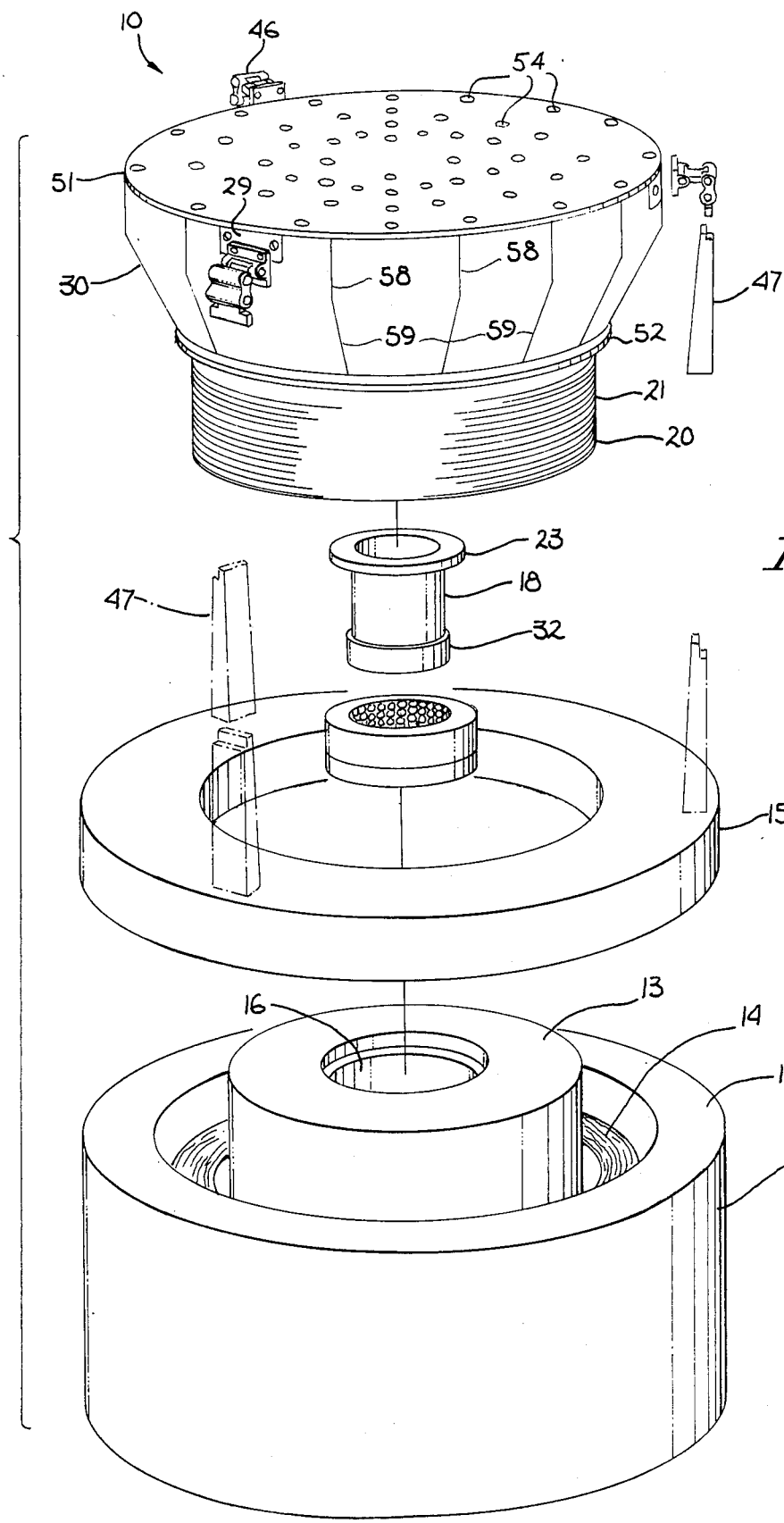
FIG. 1 is a pictorial view showing component elements of a shaker apparatus of the present invention.
Figure 2:
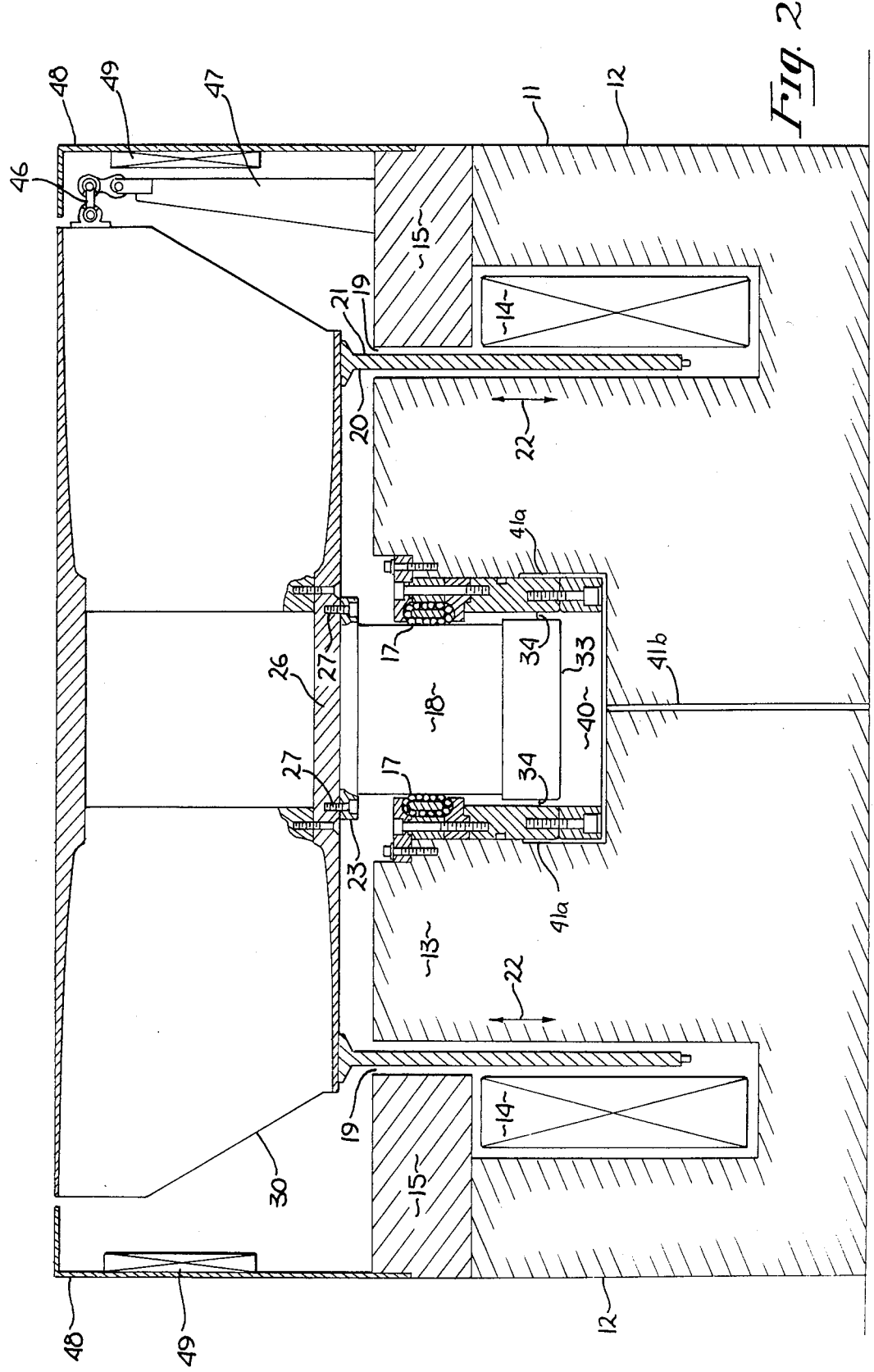
FIG. 2 is a cross-sectional view of the shaker apparatus of FIG. 1.

Referring to FIGS. 1 and 2, a shaker assembly 10 is shown. A housing 11, having an outer ring 12 and inner ring 13, houses field winding 14 which resides in concentric circles between the two rings 12 and 13. Housing 11 has center opening 16 which houses bearing 17 and armature shaft 18. A circular cover 15 in the shape of a ring is placed onto housing 11 to enclose field winding 14. Cover 15 rests atop ring 12 and over field winding 14 leaving opening 19 such that the combination of ring 12 and 15 is at approximately equal height as ring 13. The material construction of housing 11, cover 15 and field winding 14 are well-known in the prior art.

An armature coil assembly 20 comprised of a circular looping of armature winding 21 is inserted into opening 19. Armature coil 20 resides within a circle formed by field coil 14 and cover 15, and ring 13 resides within armature coil 20. Armature coil 20 does not physically touch members 13, 14 and 15 so that armature coil 20 may freely move in an axial direction (up and down in the drawing) within opening 19. By applying a varying driving signal to the armature coil 20, it can move (shake) in response to the driving signal in an axial direction shown by arrows 22. A variety of prior art armature coils may be used for armature coil 20, however, in the present invention a special armature coil 20 was designed to mate directly onto armature frame 30.

Figure 3:
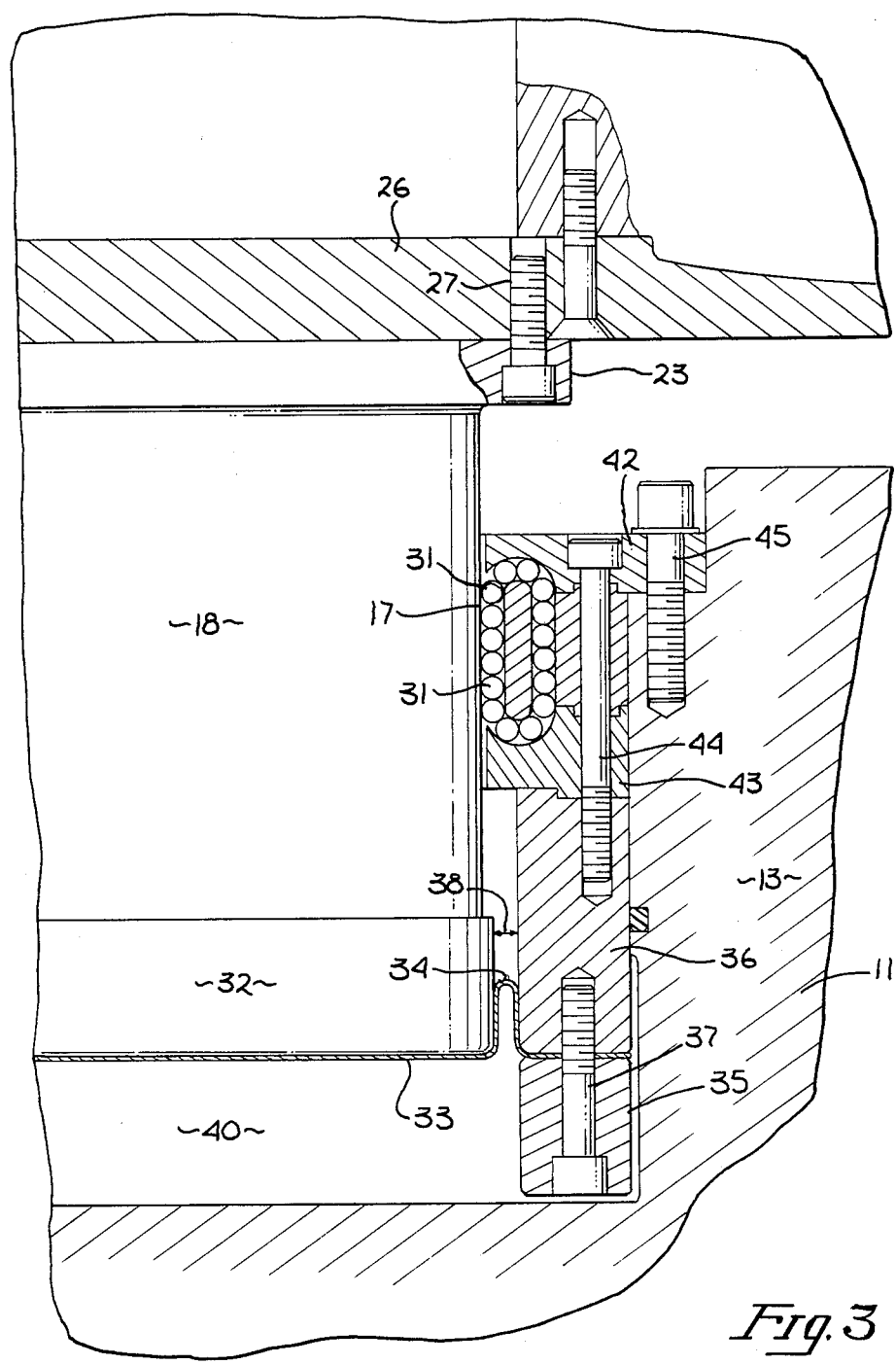
FIG. 3 is an enlarged cross-sectional view of a portion of FIG. 1 showing a placement of a bearing of the present invention.
Figure 5A:
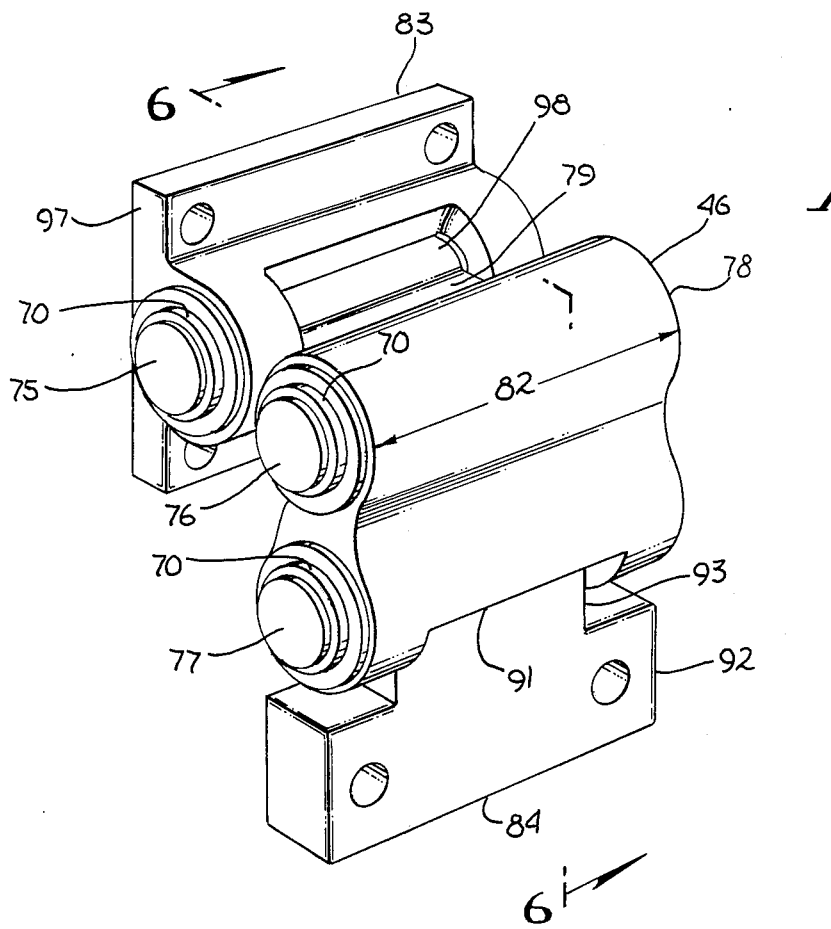
FIG. 5a is a pictorial view of a link arm of the present invention.

FIG. 3 is an enlargement of a portion of FIG. 2 and illustrates the placement of members within central openings 16. Referring to FIGS. 1, 2 and 3, armature coil 20 is supported to housing 11 by center shaft 18 and bearing 17. The shaft 18 has an upper lip 23 which is bolted onto the center hub 26 of armature frame 30 by bolts 27. It will be noted that, alternatively, bolts 27 may be reversed such that the bolts are inserted from the top of the armature frame, through center hub 26 and upper lip 23. The shaft 18 is inserted into central opening 16 of housing 11. A bearing 17 having recirculating balls 31 makes contact with a portion of the shaft 18.

A bottom shaft member 32 of the shaft 18 fits into diaphragm 33 which is made from a flexible material, such as rubber. Diaphragm 33 is held in place between support members 35 and 36 which are joined together by bolt 37. Diaphragm 33 also has a raised portion 34 which surrounds bottom shaft member 32 and acts as a spacer for a gap 38 between bottom shaft member 32 and support members 35 and 36. An air filled area 40 below the diaphragm 33 forms a piston. The weight of added test loads attached to the armature frame 30 may be compensated by the introduction of pressurized air into area 40. The introduction of pressurized air into area 40 by openings 41a permits the selective centering of the armature coil axially. An air opening 41b provides a vent to the external atmosphere.

The bearing 17 is held in place by bearing support members 42 and 43 which clamp the bearing 17 such that balls 31 make contact with shaft 18. Bearing support members 43 is coupled to support member 36 by bolts 44 and bearing support member 42 is coupled to ring 13 of housing 11 by bolts 45. The bearing 17 is held in place against shaft 18 such that as shaft 18 moves axially, the balls 31 provide the load transfer from shaft 18 to ring 13 of housing 11. Balls 31 also provide low resistance for movement of shaft 18 and position shaft 18 to move in an axial direction within central opening 16. Members 35, 36, 42 and 43 may be made from any number of hardened materials, such as metal, plastic, etc., and bolts 27, 37, 44 and 45 may be of a variety of commercially available bolts.

In the preferred embodiment, a constant DC voltage is impressed across field winding 14 and a varying driving signal is impressed across armature winding 21 to control the force generated in armature coil 20 (control lines and amplifiers are not shown in the drawing). The armature frame 30 which is fixed onto the armature coil 20 moves in unison to the armature coil 20. The shaft 18 attached to the armature frame 30 moves within bearing 17 wherein bearing 17 provides a low friction of mechanical coupling of shaft 18 to housing 11.

To prevent wobble at the upper extremes of armature frame 30, a link arm 46 is used to restrict any movement other than in the axial direction. Although only three link arms 46 are shown in the drawing, any number greater than one, may be used. Each of the link arms 46 is fixed onto armature frame 30 and also to individual stanchions 47 which are fixed onto cover 15. A protective covering 48 attached to cover 15 and housing 11 encloses link arm 46 and stanchions 47. A degauss coil 49 is attached to the inside of cover 48 and provides reduced stray magnetic field above armature frame 30.

Although the preferred embodiment describes the basic elements in a specific style and configuration, a variety of prior art armature type shakers may be used.

ARMATURE FRAME

Referring to FIGS. 1, 4a and 4b, the armature frame 30 and armature coil 20 is shown. Armature frame 30 is comprised of a top plate 51, bottom plate 52 and middle section 53. The preferred embodiment utilizes circular plates 51 and 52, however, the shape of the plates 51 and 52 may be adapted to meet other shaker designs. Plate 51 includes tapped openings 54 for bolting on items to be shaken.

The middle section 53 is also of a circular shape such that upper portion 55 couples to top plate 51 and lower portion 56 couples to bottom plate 52. Middle section 53 has a hollow core 57 and ribs 58 about the outer periphery. The area 59 between the ribs are devoid of any material to allow middle section 53 to basically have a ribbed design.

Although the size of the plates 51 and 52 are discretionary, the preferred embodiment has the top plate 51 of a larger diameter than bottom plate 52. The middle section 53 has the upper portion 55 and lower portion 56 at different diameters to correspond to plates 51 and 52, respectively. Ribs 58 are tapered to compensate for this difference in diameter. The two plates 51 and 52 are coupled to mid-section 53 by bolts 60 and adhesive, although any other equivalent fastening system will work. The armature coil 20 is coupled to bottom plate 52 also by bolts 61. When mounted together, armature frame 30 and armature coil 20 are a single unit as shown in FIG. 1.

To raise the frequency of the undesirable effect of the telescoping resonance, the frame 30 is constructed to have a table height 62 which is shorter than prior art tables. The singular design of combining armature frame 30 and armature coil 20 also reduces the physical height of the moving elements from prior art armature coil and frame combinations, thereby further aiding in raising the frequency of telescoping resonance. The shorter height 62 raises the frequency of the telescoping resonance so that the telescoping resonance lies above the test frequency range and does not interfere with the testing. However, as height 62 is made shorter, a bending resonance associated with the mass and physical properties of the materials becomes more significant. The bending resonance has the effect of non-uniform acceleration at different points of the frame 30, thereby causing distorted test readings.

The frame 30 of the present invention does not completely remove the bending resonances, but instead increases the resonant points to frequencies which are higher than the test spectrum. Most shaker testing is achieved within a frequency spectrum of D.C. to 2000 Hz. Typical prior art armature frames, especially those having shortened height (as in the case of the table 30 of the preferred embodiment), will have bending resonances within the D.C. to 2000 Hz spectrum. The design of the present invention causes these bending resonance frequencies to shift to a point above this spectrum. Ideally such frequency shifting is achieved by using a low density-high elastic material, such as beryllium, but the cost is usually prohibitive for commercial sales of beryllium armature frame.

The frame 30 of the present invention achieves this shifting of the bending resonant frequencies by utilizing a laminated design which has a higher modulus material on the outside and a lower density honey-combed material on the inside. By using the laminated/honeycombed design, more common and less expensive materials may then be used to provide equivalent results.

The armature frame 30 uses a thin top plate 51 which has a thickness of approximately ⅛ inch at the outer edge 63 and 1 inch near the center 64. Bottom plate 52 is also thin having a thickness of approximately ⅛ inch at the outer edge 65 and 1 inch near the center 66. The plates 51 and 52 have tapered thicknesses to provide more bending support in the center 64 and 66.

The plates 51 and 52 have a high Young's modulus of elasticity while the middle section 53 is constructed of material having low density. The preferred embodiment uses steel for plates 51 and 52 and magnesium for section 53. It is known that magnesium, steel and aluminum have approximately the same density to modulus ratio which results in the three materials having approximately the same resonant frequencies. Steel was chosen for plates 51 and 52 due to its higher Young's modulus while magnesium was chosen for middle section 53 for its low density. Use of the multi-materials construction in combination with the tapered ribbed design of middle section 53 shifts the resonating points of frame 30 bending resonances to frequencies above the 2000 Hz test spectrum. The design of the preferred embodiment has been finally trimmed wherein the armature frame 30 can operate up to 3000 Hz encountering only 2 bending resonances.

Therefore by using a laminated/honeycombed design having a thin layer of highly rigid material on the exterior and a lower density material on the interior of the honeycombed design, an armature frame which effectively removes bending resonances from a spectrum of test frequencies is achieved.

LINK ARM

The link arm 46 of FIG. 1 is shown in more detail in FIGS. 5a, 5b, 6a, 6b and 6c. Referring to FIGS. 5a, 5b, 6a, 6b and 6c a link arm 46 is shown comprised of a body 78, linkage 79 and brackets 83 and 84 and three cylindrically shaped shafts 75, 76 and 77. Body 78 has two parallel cylindrical bores 80 and 81 along the length 82 of the body 78. Body 78 has an opening 91 for exposing a portion of bore 81. Body 78 also has a second opening 90 for exposing a portion of bore 80. Opening 90 is in a direction 90 degrees from opening 91.

The bracket 84, having a base 92 and extension 93, has a cylindrical bore 94 at the end of extension 93 opposite base 92. Extension 93 is inserted into opening 91 until bores 81 and 94 are aligned, at which point shaft 77 is slideably inserted through both bores 81 and 94 to couple bracket 84 to body 78. Shaft 77 permits body 78 and bracket 84 to rotate about the shaft 77. The linkage 79 having bores 95 and 96 at each end couples bracket 83 to body 78. Bore 95 is inserted into opening 90 until bores 95 and 80 are aligned and then shaft 76 is inserted through both bores 95 and 80 to couple linkage 79 to body 78. Body 78 and linkage 79 freely rotate about shaft 76.

The bracket 83, having a base 97 and bore 85, has opening 98 which exposes a portion of bore 85. Opening 98 faces in the direction of opening 90 so that the other end of the linkage of bore 96 is inserted into opening 98. Bores 96 and 85 are aligned to permit shaft 75 to be inserted through both bores 96 and 85 to couple bracket 83 to body 78, which freely rotate about shaft 75. Further, each end of shafts 75–77 are mounted onto bracket 83 and body 78 by bearings 70. The bearings may be of any prior art high axial load bearings and are used primarily to transfer lateral loads from brackets 83 to 84.

As used in the shake table of the present invention, bracket 83 is bolted onto plate 29 of frame 30 as shown in FIG. 1. Bracket 92 is bolted onto stanchions 47 of FIG. 1. The link arm 46 permits pivotal movement about shafts 75–77 but prohibits any lateral movement along the upper shafts. Therefore by positioning a plurality of link arams 46, the wobble of armature frame 30 is reduced. The drawing of FIG. 1 shows only three such link arms but any number greater than one may be used. If only two link arms 46 are used, the two must be placed in such a way so that a pivotal movement of one link arm is opposed by the lateral positioning of the second link arm (that is, the two link arms must not be placed 180 degrees apart).

Figure 6A:
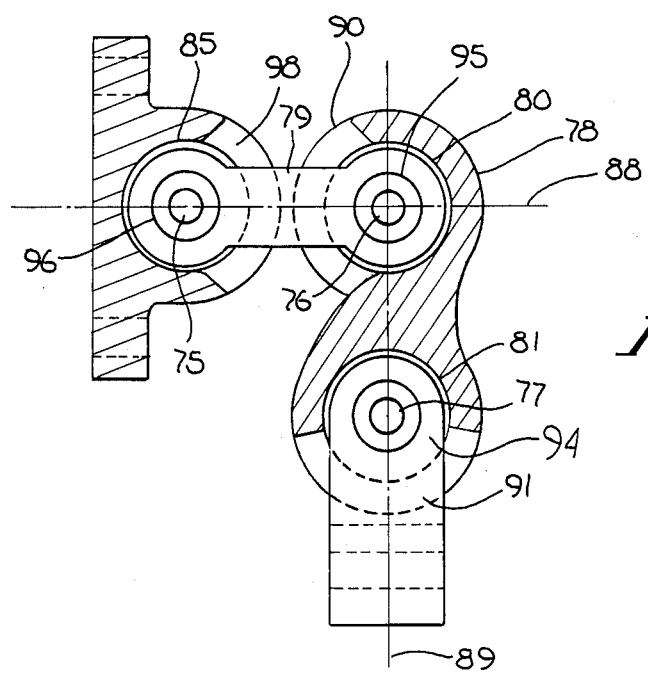
FIG. 6a is a cross-sectional view of the link arm of FIG. 5a showing its static state.
Figure 5B:
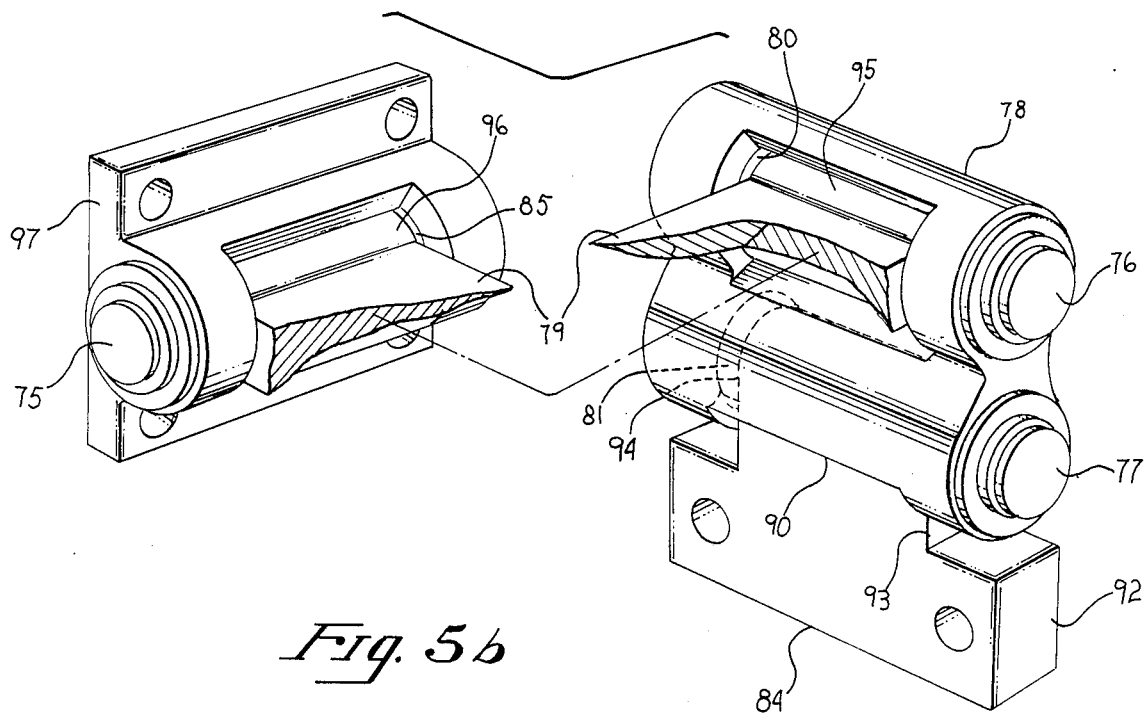
Figure 6B:
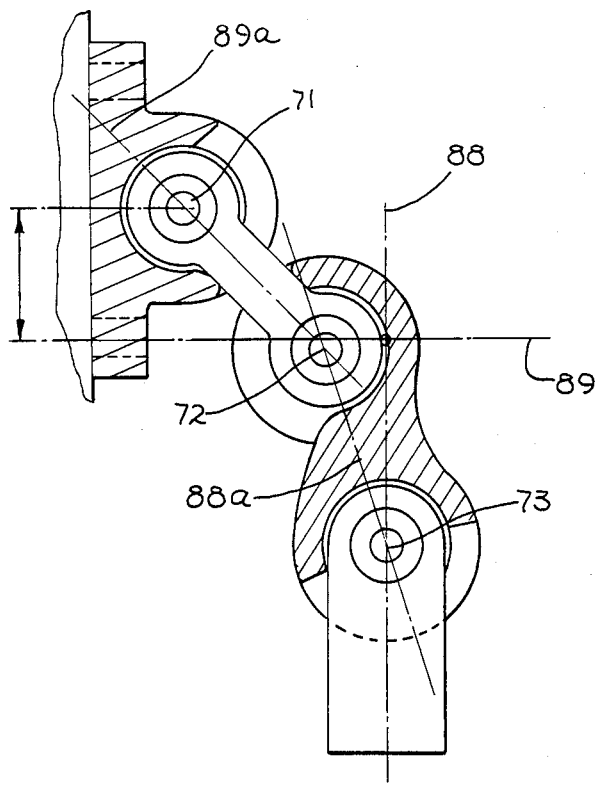
FIG. 6b is a cross-sectional view of the link arm of FIG. 5a showing the elongated state in a first direction.
Figure 6C:
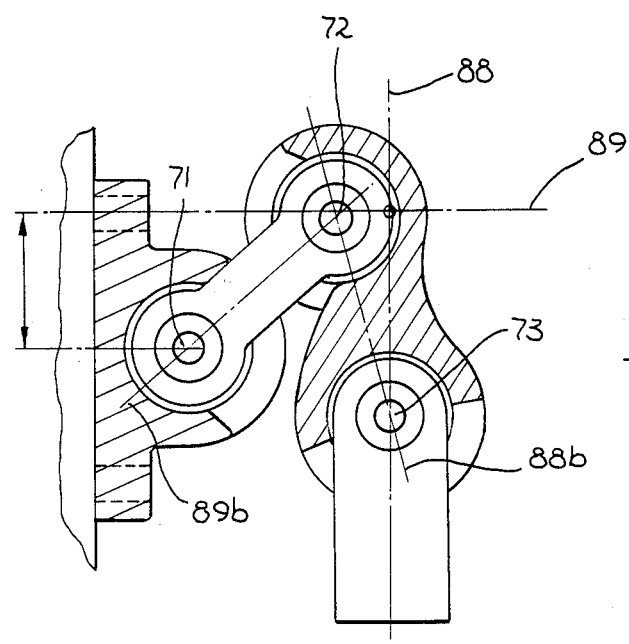
FIG. 6c is a cross-sectional view of the link arm of FIG. 5a showing its elongated state in a second direction.

FIGS. 6a, 6b and 6c illustrate another advantage of the link arm 46. As shake table 30 of FIG. 1 moves axially any upper end support elements experience a change in the linear distance between its static state and its stretched state (foreshortening). Where FIG. 6a shows the static state of link arm 46 having axes 88 and 89 at right angles to each other, FIG. 6b illustrates the foreshortening encountered. Link arm 46 by pivoting at the three shaft centers 71, 72 and 73 compensates from the foreshortening without placing additional load on the armature frame 30. Axis 88 shifts to 88a and axis 89 shifts to 89a. FIG. 6c illustrates the alternative case where armature frame 30 moves in the opposite direction and again encounters foreshortening. Link arm 46 compensates again by shifting axis 88 to 88b and axis 89 to 89b.

Although the preferred embodiment is described in specific detail, it is to be noted that the novelty of the invention resides in the two bracket ends of the link arm being coupled by three pivoting points. Further, although the link arm 46 is presented to alleviate the foreshortening problem encountered on shake tables, it is readily apparent that the link arm may be used in other applications without departing from the spirit and scope of the invention. Also, the materials used for constructing the link arm is of metal in the preferred embodiment, however, any variety of materials may be used.

Thus an improved linkage mechanism has been described which permits pivotal movement in one direction but opposes lateral movement has been described.

RECIRCULATING BEARING

Figure 7:
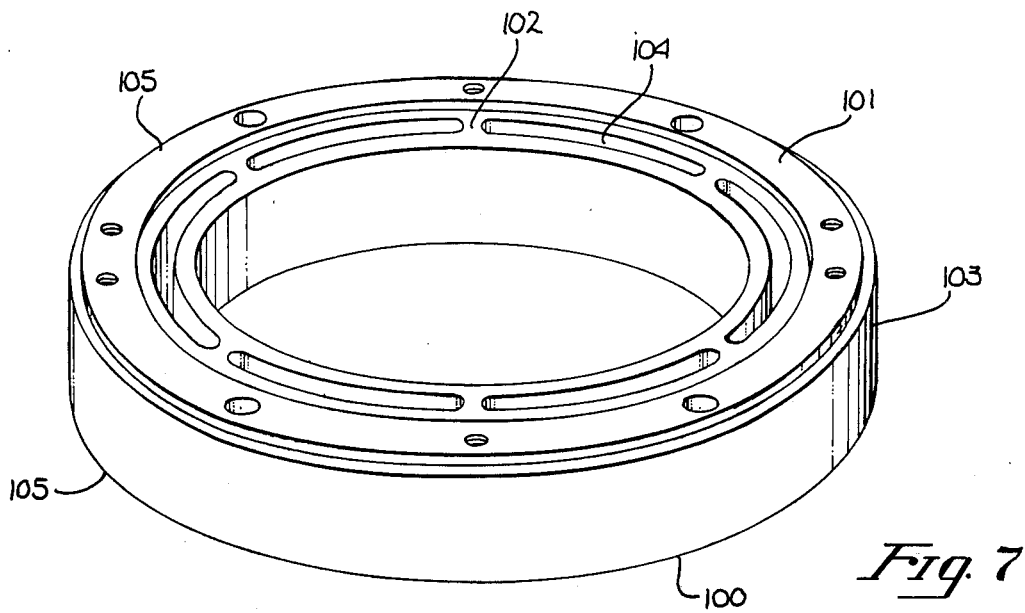
FIG. 7 is a pictorial view of a bearing housing of the present invention.
Figure 8:
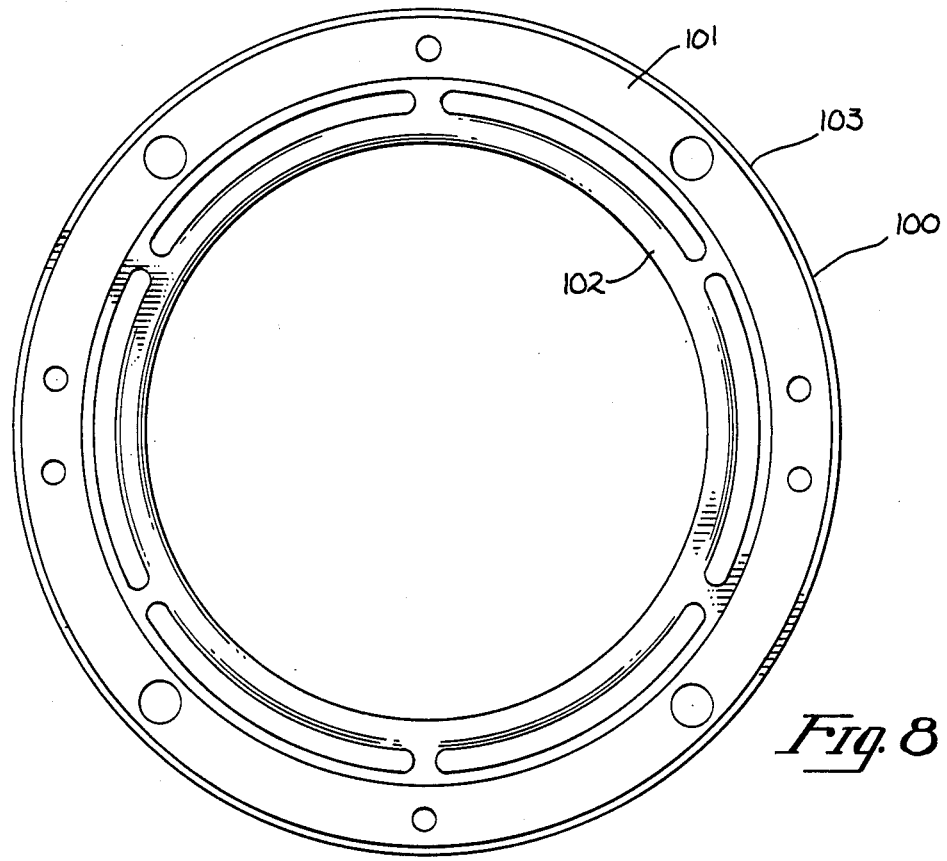
FIG. 8 is a top plan view of the bearing housing of FIG. 7.

Referring to FIGS. 7 and 8, a bearing body 100 of the bearing 17 of FIG. 1 is shown. Body 100 is circular in shape and has a bearing housing 101 surrounding an interior channel element 102 and in turn is surrounded externally by casing 103. Interior channel element 102 includes a plurality of elongated return channel openings 104, which pass completely through element 102. Further, element 102 is recessed below the two end surfaces 105 of housing 101.

Figure 9:
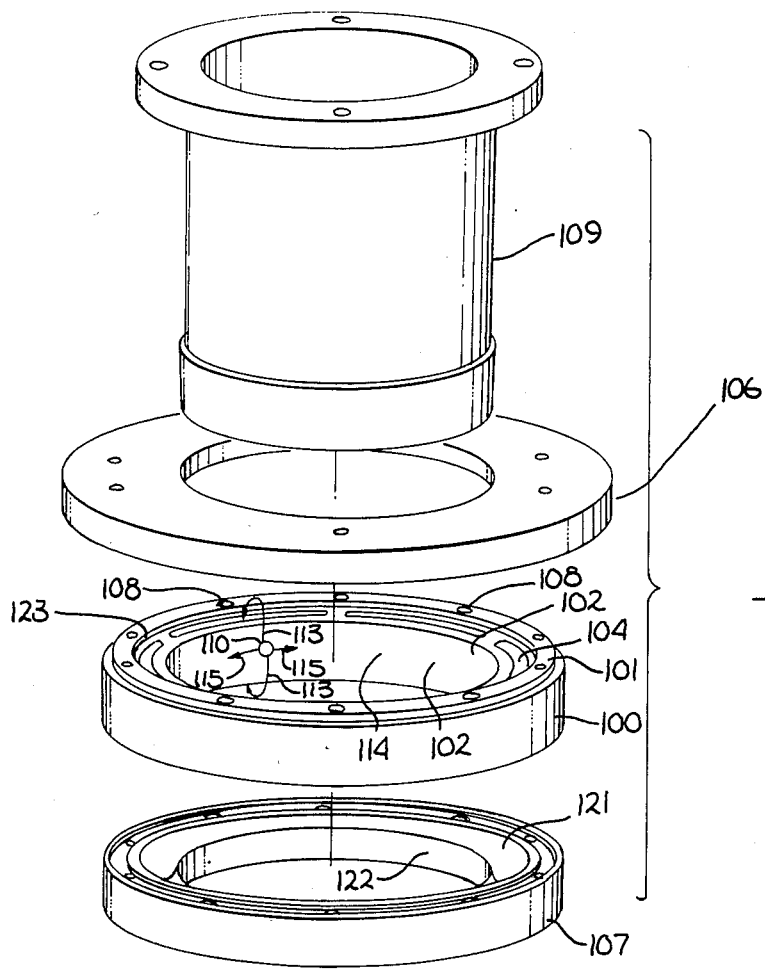
FIG. 9 is a pictorial view of the bearing housing of FIG. 7, top and bottom bearing retainers and a shaft which is inserted into the bearing housing.
Figure 10:
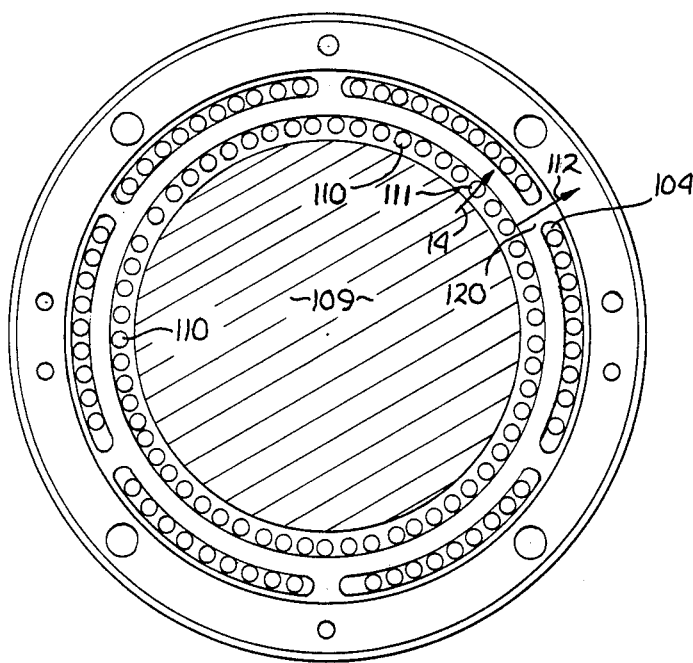
FIG. 10 is a cross-sectional view of an assembled bearing shaft, and placement of balls within the bearing housing.

Also, referring to FIG. 9, bearing body 100 is shown with retainers 106 and 107 and shaft 109. Once the shaft 109 has been inserted through the bearing 17, retainer 107 is fixed to housing 101 by screws (not shown), housing 101 having tapped holes 108 for accepting the screws. Then spherical balls 110 are inserted into channels 104 and between shaft 109 and interior element 102 as shown in FIG. 10. In the preferred embodiment, retainers 106 and 107 are designed to correspond to members 42 and 43 of FIG. 3, respectively.

Referring to FIGS. 9 and 10, shaft 109 is shown surrounded by a plurality of balls 110. When the shaft 109 moves axially (as in the case with shaft 18 of FIG. 1), the balls 110 will also roll in relatively the same direction, thereby presenting a lower coefficient of friction to shaft 109. As the shaft 109 moves axially, balls 110 first move along a wall 114 and recirculate through channels 104 as shown by arrows 113. The recirculation is possible because the retainers 106 and 107 have recessed areas 121, as well as shortened inner wall 122, which operate in conjunction with recessed portions 123 of element 102 to permit the balls 110 to freely move as shown by arrows 113.

Balls 110 are also capable of providing a low friction surface when the shaft 109 is moved in a rotational direction. Balls 110 will move in a rotational direction as the shaft 109, as shown by arrows 115. Therefore, the shaft 109 may move linearly, rotationally, or a combination of the two motions. The design of the bearing 17 allows any given ball 110 to cycle through any of the channels 104. The load transfer is accomplished by the balls 110 in contact with the shaft 109 and stanchions 120 which are located between channels 104. The arrows 111 and 112 show the route of the load transfer from shaft 109 to housing 101.

A significant advantage of this design resides in its ability to simultaneously perform as a low friction bearing for both linear and rotational movement of the shaft. Although the shaker of the preferred embodiment only moves linearly, the use of the bearing is not constrained to this specific application. Unlike prior art linear bearings, the bearing of the present invention allows more shaft surface area contact with balls 110 allowing for a more even distribution of the load transfer from the shaft 109 to bearing 17.

Further, because more surface area of the shaft 109 makes contact with balls 110, the load transfer 111 is accomplished across a larger number of balls 110 than prior art bearings. The larger number of balls 110 making contact to shaft 109 permits higher load ratings or for the same rating, allows the balls 110 to be constructed of lighter load bearing material, such as plastic, whereas prior art designs required higher load transfer requirements per ball for a given diameter shaft.

Thus a recirculating bearing having a much higher load capability and the ability to perform as a bearing for simultaneous linear and rotational motion is disclosed.

Although the present invention has been described with reference to FIGS. 1–10, it will be apparent to one skilled in the art that the teachings of the present invention may be used in a variety of other applications.

I claim:

1. In a vibration testing device, including a reciprocative armature frame having means for mounting specimens thereon to be subjected to a spectrum of vibration test frequencies, said armature frame comprising:
   an upper plate comprised of a first material and formed with a central region which is thicker than the outer region thereof;
   a lower plate comprised of a second material;

an intermediate member comprised of a third material disposed between and coupled to said upper and lower plates to form a unitary structure, said intermediate member including a hollow core and a plurality of ribs disposed substantially perpendicular to said plates;

each of said first and second materials having a higher modulus of elasticity than said third material;

said third material having a lower mass density than said first and second materials; and whereby undesirable resonant frequency ranges inherent within said device are shifted outside of the spectrum of vibration test frequencies.

2. The armature frame of claim 1, wherein said plurality of ribs extend radially from said hollow core and are circumscribed about an exterior perimeter of said intermediate member.

3. The armature frame of claim 2, wherein said plates and said intermediate member are circular in shape.

4. The armature frame of claim 2, wherein the combination of said upper plate and an upper portion of said intermediate member coupled to said upper plate has a larger diameter than the combination of said lower plate and a lower portion of said intermediate member coupled to said lower plate.

5. The armature frame of claim 4, wherein said first, second and third materials have approximately the same density to modulus ratio.

6. The armature frame of claim 4, wherein said first and second materials are comprised of steel, and said third material is comprised of magnesium.

7. The armature frame of claim 5 or 6, further including an armature coil coupled onto said lower plate, wherein said armature coil is an integral part of said armature frame and moves in unison with said armature frame.

8. The armature frame of claim 7, wherein said upper plate includes a plurality of tapped holes for mounting an object which is to be subjected to said testing device.

9. The armature frame of claim 8, wherein said spectrum of test frequencies is from DC to 2000 Hz.

10. The armature frame of claim 8, wherein said plates are bolted onto said intermediate member.

* * * * *

UNITED STATES PATENT AND TRADEMARK OFFICE
CERTIFICATE OF CORRECTION

PATENT NO. : 4,715,229

DATED : December 29, 1987

INVENTOR(S) : Gary Butts

It is certified that error appears in the above-identified patent and that said Letters Patent is hereby corrected as shown below:

Column 1, line 30, change "shakaing" to --shaking--.

Column 4, line 63, change "extremes" to --extreme--.

Column 7, line 14, delete "upper";

line 15, change "arams" to --arms--;

line 31, change "from" to --for--.

Column 8, line 13, change "recirculate" to --recirculates--.

Signed and Sealed this

Sixteenth Day of August, 1988

Attest:

DONALD J. QUIGG

*Attesting Officer*       *Commissioner of Patents and Trademarks*